United States Patent
Sugisawa

(10) Patent No.: US 10,566,663 B2
(45) Date of Patent: Feb. 18, 2020

(54) POWER SUPPLY CONTROL DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yuuki Sugisawa, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/778,339

(22) PCT Filed: Jan. 13, 2017

(86) PCT No.: PCT/JP2017/001024
§ 371 (c)(1),
(2) Date: May 23, 2018

(87) PCT Pub. No.: WO2017/126430
PCT Pub. Date: Jul. 27, 2017

(65) Prior Publication Data
US 2018/0351213 A1 Dec. 6, 2018

(30) Foreign Application Priority Data
Jan. 19, 2016 (JP) .................................. 2016-008108

(51) Int. Cl.
*H02J 7/00* (2006.01)
*H01M 10/44* (2006.01)
(Continued)

(52) U.S. Cl.
CPC ........... *H01M 10/44* (2013.01); *H01M 10/48* (2013.01); *H02H 3/08* (2013.01); *H02J 7/0029* (2013.01);
(Continued)

(58) Field of Classification Search
CPC ..................................................... H01M 10/44
(Continued)

(56) References Cited

U.S. PATENT DOCUMENTS

| 5,194,799 A * | 3/1993 | Tomantschger .. | H01M 10/4207 320/103 |
| 7,688,037 B2 * | 3/2010 | Huh ...................... | H02J 7/0072 320/112 |

(Continued)

FOREIGN PATENT DOCUMENTS

| JP | 2012-244605 A | 12/2012 |
| JP | 2015-002661 A | 1/2015 |

(Continued)

OTHER PUBLICATIONS

Search Report for PCT/JP2017/001024, dated Mar. 14, 2017.

*Primary Examiner* — Yalkew Fantu
(74) *Attorney, Agent, or Firm* — Honigman LLP

(57) ABSTRACT

In a power supply control device, a microcomputer controls the supply of power from a battery to loads via a battery conductor by individually switching on and off switches. While power is being supplied from the battery to the microcomputer, current flows from the positive electrode of the battery to a battery terminal, the battery conductor, a diode, a resistor, a regulator, the microcomputer, an intermediate conductor, a fuse portion, a GND conductor, and a GND terminal in this order. If a current greater than or equal to a predetermined current flows to the fuse portion, the fuse portion breaks.

3 Claims, 4 Drawing Sheets

(51) Int. Cl.
*H01M 10/48* (2006.01)
*H02H 3/08* (2006.01)
*H01M 10/42* (2006.01)

(52) U.S. Cl.
CPC ... *H02J 7/0063* (2013.01); *H01M 2010/4271* (2013.01); *H01M 2200/103* (2013.01); *H01M 2220/20* (2013.01); *H02J 7/0031* (2013.01); *H02J 2007/0039* (2013.01)

(58) Field of Classification Search
USPC .......................................................... 320/314
See application file for complete search history.

(56) References Cited

U.S. PATENT DOCUMENTS

| | | | | |
|---|---|---|---|---|
| 7,969,046 | B2 * | 6/2011 | Nakayama | H03K 17/162 |
| | | | | 307/127 |
| 2003/0048006 | A1 * | 3/2003 | Shelter, Jr. | H02J 9/061 |
| | | | | 307/64 |
| 2009/0235107 | A1 * | 9/2009 | Gelonese | G06F 1/26 |
| | | | | 713/340 |
| 2013/0234504 | A1 * | 9/2013 | Morita | H01M 10/425 |
| | | | | 307/9.1 |
| 2017/0080883 | A1 * | 3/2017 | Yasunori | B60R 16/02 |

FOREIGN PATENT DOCUMENTS

| | | |
|---|---|---|
| JP | 2015-149531 A | 8/2015 |
| WO | 2014/109364 A1 | 7/2014 |

* cited by examiner

POWER SUPPLY CONTROL DEVICE

CROSS-REFERENCE TO RELATED APPLICATIONS

This application is the U.S. national stage of PCT/JP2017/001024 filed Jan. 13, 2017, which claims priority of Japanese Patent Application No. 2016-008108 filed on Jan. 19, 2016, which is incorporated herein by reference in its entirety.

FIELD OF THE INVENTION

The present disclosure relates to a power supply control device that controls the supply of power from a battery to a load.

BACKGROUND OF THE INVENTION

A power supply control device that controls the supply of power from a battery to a load is installed in vehicles (e.g., see JP 4473294B). In the power supply control device disclosed in JP 4473294B, a switch is connected between the positive electrode of a battery and one end of a load, and the negative electrode of the battery and the other end of the load are grounded. The power supply control device disclosed in Patent Document 1 includes a switch control portion that switches the switch on and off. The switch control portion controls the supply of power from the battery to the load by switching the switch on and off.

The switch control portion is also connected to the positive electrode of the battery, and the switch control portion receives a supply of power from the battery. At this time, current flows from the positive electrode of the battery to an output terminal via the switch control portion. The output terminal is grounded, and current that flows from the output terminal returns to the grounded negative electrode of the battery.

SUMMARY OF THE INVENTION

As an example of a conventional power supply control device such as that disclosed in JP 4473294B, there is a power supply control device in which the positive electrode of the battery, the switch control portion, and the one end of the switch are connected by a battery conductor, and the switch control portion and the output terminal are connected by an output conductor. With this power supply control device, if the switch is on, current flows from the positive electrode of the battery to the battery conductor, the switch, and the load in this order, and the load thus receives a supply of power. Also, regardless of whether or not the switch is on, current flows from the positive electrode of the battery to the battery conductor, the switch control portion, the output conductor, and the output terminal in this order, and the switch control portion thus receives power from the battery.

As an example of a power supply control device that includes a battery conductor and an output conductor, there is a power supply control device in which a battery substrate provided with a battery conductor and an output substrate provided with an output conductor are overlaid on each other with resin interposed therebetween. In this power supply control device, if the switch is kept in the on state due to a malfunction, a large current continuously flows through the switch. The switch is disposed on the output substrate, for example.

Here, if the switch is a semiconductor switch such as an FET (Field Effect Transistor) or a bipolar transistor, the switch continuously emits a large amount of heat. If the resin melts due to the heat generated by the switch, and the battery conductor and the output conductor come into contact with each other, a short-circuit forms between the positive electrode of the battery and the output terminal, and overcurrent flows between the positive electrode of the battery and the output terminal. Accordingly, there is a possibility that various problems will occur.

Normally, a fuse is installed between the positive electrode of the battery and the battery conductor. If a current that is greater than or equal to a given current flows to the fuse, the fuse breaks. For this reason, a current greater than or equal to the given current will not flow from the battery.

However, in a power supply control device in which the battery substrate and the output substrate are overlaid on each other with a gap therebetween, there is concern that the resin will melt before the fuse breaks, thus causing contact between the battery conductor and the output conductor, and the formation of a short-circuit between the positive electrode of the battery and the output terminal. Normally, the current that flows through the switch control portion is smaller than the current that flows to the load via the switch, and therefore the conducting wire used to supply power to the switch control portion is thinner than and has a larger resistance value than the conducting wire that is connected to the switch. If a short-circuit forms between the positive electrode of the battery and the output terminal, a current greater than or equal to the given current will not flow between the positive electrode of the battery and the output terminal due to the action of the fuse. However, in the case where a conducting wire that is thin and has a large resistance value is used to supply power to the switch control portion, there is concern that a current below the given current will flow through the conducting wire as overcurrent.

The present disclosure was achieved in light of the foregoing circumstances, and an object of the present disclosure is to provide a power supply control device in which there is a low probability of formation of a short-circuit between one end of a battery and an output terminal.

One aspect of a power supply control device according to the present disclosure is a power supply control device having a switch control portion that switches on and off a switch provided in a power supply path from a battery to a load and receives a supply of power from the battery, and an output terminal from which current received from the battery via the switch control portion is output, the power supply control device including: a fuse portion that is connected between the switch control portion and the output terminal, and that breaks if a current greater than or equal to a predetermined current flows to the fuse portion, wherein while power is being supplied from the battery to the switch control portion, current flows from the battery to the switch control portion, the fuse portion, and the output terminal in this order.

In the present disclosure, current flows from the battery to the switch control portion, the fuse portion, and the output terminal in this order, and power is supplied from the battery to the switch control portion. The switch control portion and the output terminal are connected via the fuse portion, and therefore a conductor that has a small surface area can be used as the conductor that is directly connected to the output terminal in the device. In this case, there is a low probability of contact between a conductor connected to one end of the battery and a conductor connected to the output terminal, and therefore there is a low probability of the formation of a short-circuit between the one end of the battery and the output terminal.

If a conductor that connects the fuse portion and the switch control portion and a conductor connected to one end of the battery come into contact with each other, current flows from the battery to the fuse portion and the output terminal in this order. If a current greater than or equal to the predetermined current flows to the fuse portion, the fuse portion breaks. Accordingly, if a conductor that connects the fuse portion and the switch control portion and a conductor connected to one end of the battery come into contact with each other, a current greater than or equal to the predetermined current will not flow between the battery and the output terminal.

In another aspect of the power supply control device according to the present disclosure, the power supply control device further includes: a battery conductor that is provided in a current path of current that flows from the battery to each of the switch and the switch control portion; a battery substrate on which the battery conductor is formed; an output conductor that is provided in a current path of current that flows from the fuse portion to the output terminal; and an output substrate on which the output conductor is formed, wherein the battery substrate and the output substrate are overlaid on each other with a gap therebetween, and the output conductor faces a portion of the battery substrate other than a portion where the battery conductor is formed.

In the present disclosure, the output conductor formed on the output substrate faces a portion of the battery substrate other than the portion where the battery conductor is formed. For this reason, even if the resin sandwiched by the output substrate and the battery substrate melts, and the output substrate and the battery substrate come into contact with each other, there is a low probability of contact between the output conductor and the battery conductor. Accordingly, the probability of contact between the one end of the battery and the output terminal is even lower.

In another aspect of the power supply control device according to the present disclosure, the power supply control device includes: an intermediate conductor that is provided in a current path of current that flows from the switch control portion to the fuse portion; and an intermediate substrate on which the intermediate conductor is formed, wherein the output substrate and the intermediate substrate are overlaid on each other with a gap therebetween, and the output conductor faces a portion of the intermediate substrate other than a portion where the intermediate conductor is formed.

In the present disclosure, the output conductor formed on the output substrate faces a portion of the intermediate substrate other than the portion where the intermediate conductor is formed. For this reason, even if two resin portions respectively sandwiched between two substrates out of the battery substrate, the intermediate substrate, and the output substrate melt, and two adjacent substrates among the battery substrate, the intermediate substrate, and the output substrate come into contact with each other, there is a low probability of contact between the battery conductor and the intermediate conductor, contact between the intermediate conductor and the output conductor, and the resulting formation of a short-circuit between the one end of the battery and the output terminal.

In another aspect of the power supply control device according to the present disclosure, the fuse portion has a plurality of fuse elements that break if a current greater than or equal to the predetermined current flows to the fuse portion, and the plurality of fuse elements are connected in parallel to each other.

In the present disclosure, the switch control portion and the output terminal are connected via a plurality of fuse elements, and therefore even if one of the fuse elements becomes defective, the supply of power from the battery to the switch control portion is continued, and the switch control portion continues to operate.

Advantageous Effects of Disclosure

According to the present disclosure, the switch control portion and the output terminal are connected via a fuse portion, and therefore there is a low probability of formation of a short-circuit between one end of the battery and the output terminal.

DETAILED DESCRIPTION OF THE PREFERRED EMBODIMENTS

Hereinafter, the present disclosure will be described in detail based on the diagrams that show an embodiment of the present disclosure.

Figure 1:
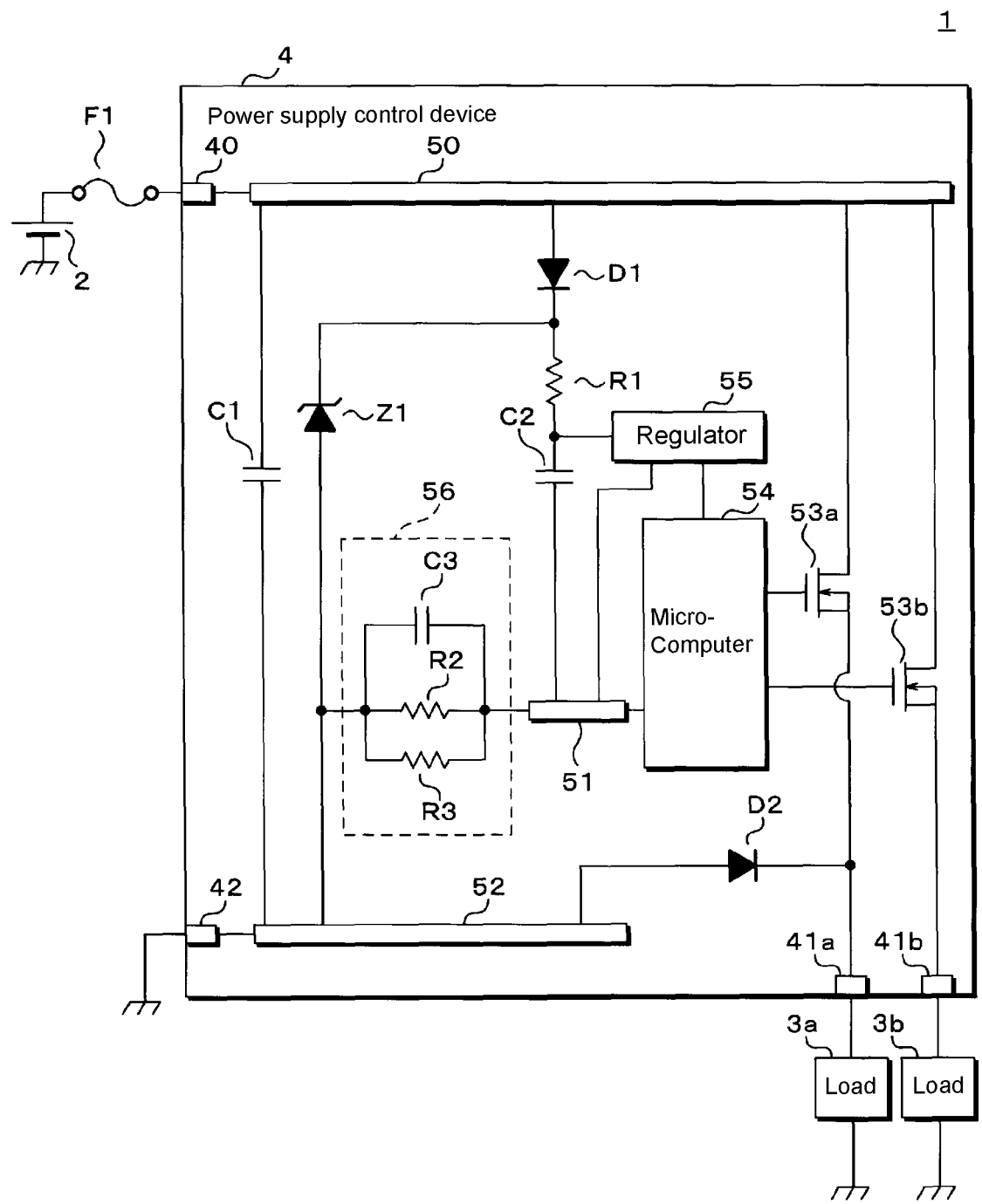
FIG. 1 is a block diagram showing a configuration of main portions of a power supply system in an embodiment.

FIG. 1 is a block diagram showing the configuration of main portions of a power supply system 1 in an embodiment. The power supply system 1 is suitably installed in a vehicle, and includes a battery 2, loads 3a and 3b, a power supply control device 4, and a fuse F1. The power supply control device 4 has a battery terminal 40, load terminals 41a and 41b, and a GND terminal 42. A positive electrode of the battery 2 is connected to the battery terminal 40 of the power supply control device 4 via the fuse F1. The load terminals 41a and 41b of the power supply control device 4 are respectively connected to one end of the load 3a and one end of the load 3b. A negative electrode of the battery 2, other ends of the loads 3a and 3b, and the GND terminal 42 of the power supply control device 4 are grounded.

The battery 2 supplies power to the power supply control device 4 via the fuse F1, and also supplies power to the loads 3a and 3b via the fuse F1 and the power supply control device 4. When the battery 2 supplies power, current is input from the positive electrode of the battery 2 to the battery terminal 40 of the power supply control device 4 via the fuse F1, and current is output from at least one among the load terminals 41a and 41b and the GND terminal 42. If a current that is greater than or equal to a given current flows to the fuse F1, the fuse F1 breaks.

The power supply control device 4 operates while power is supplied from the battery 2 to the power supply control device 4. The supply of power from the battery 2 to the load 3a and the supply of power from the battery 2 to the load 3b are individually controlled by the power supply control device 4. For example, if the power supply control device 4 receives a load signal that indicates which of the loads 3a and 3b is to be operated and which is to be stopped, the power supply control device 4 controls the supply of power from the battery 2 to the loads 3a and 3b based on the content of the received load signal.

The loads 3a and 3b are each an electrical device that is installed in the vehicle. The loads 3a and 3b each operate if power is received from the battery 2, and stop operating if the supply of power from the battery 2 is stopped.

The power supply control device 4 further includes a battery conductor 50, an intermediate conductor 51, a GND conductor 52, switches 53a and 53b, a microcomputer 54, a regulator 55, a fuse portion 56, capacitors C1 and C2, diodes D1 and D2, a resistor R1, and a Zener diode Z1. The switches 53a and 53b are each an N-channel FET. The fuse portion 56 has a capacitor C3 and resistors R2 and R3.

The battery conductor 50 is connected to the battery terminal 40. Drains of the switches 53a and 53b, one end of the capacitor C1, and an anode of the diode D1 are individually connected to the battery conductor 50. Sources of the switches 53a and 53b are respectively connected to the load terminals 41a and 41b. Gates of the switches 53a and 53b are individually connected to the microcomputer 54.

A cathode of the diode D1 is connected to one end of the resistor R1 and a cathode of the Zener diode Z1. The other end of the resistor R1 is connected to the regulator 55 and one end of the capacitor C2. The intermediate conductor 51 and the microcomputer 54 are also individually connected to the regulator 55. The microcomputer 54 is also connected to the intermediate conductor 51. The intermediate conductor 51 is also connected to other end of the capacitor C2 and one end of each of the capacitor C3 and the resistors R2 and R3 of the fuse portion 56. The GND terminal 42, other ends of the capacitors C1 and C3 and resistors R2 and R3, and anodes of the diode D2 and the Zener diode Z1 are connected to the GND conductor 52. A cathode of the diode D2 is connected to the load terminal 41a.

As described above, the one end of the fuse portion 56 is connected to the microcomputer 54 via the intermediate conductor 51, and the other end of the fuse portion 56 is connected to the GND terminal 42 via the GND conductor 52.

In each of the switches 53a and 53b, current can flow between the drain and the source if the voltage at the gate is greater than or equal to a given voltage. At this time, the switches 53a and 53b are each on. Also, in each of the switches 53a and 53b, current does not flow between the drain and the source if the voltage at the gate is below the given voltage. At this time, the switches 53a and 53b are each off. The microcomputer 54 adjusts the voltages at the gates of the switches 53a and 53b individually with reference to the potential of the intermediate conductor 51. Accordingly, the microcomputer 54 switches the switches 53a and 53b on and off individually.

For example, the microcomputer 54 switches the switches 53a and 53b on and off individually based on the content of the previously-described load signal. The microcomputer 54 functions as a switch control portion.

If the microcomputer 54 switches on the switch 53a, current flows from the positive electrode of the battery 2 to the fuse F1, the battery terminal 40, the battery conductor 50, the switch 53a, the load terminal 41a, and the load 3a in this order, and thus power is supplied from the battery 2 to the load 3a. Accordingly, the switch 53a is provided on the power supply path from the positive electrode of the battery 2 to the one end of the load 3a, and the battery conductor 50 is provided on the current path of current that flows from the positive electrode of the battery 2 to the drain of the switch 53a. The load 3a operates while power is supplied from the battery 2 to the load 3a.

If the microcomputer 54 switches off the switch 53a, the supply of power from the battery 2 to the load 3a is stopped, and the load 3a stops operating.

Similarly, if the microcomputer 54 switches on the switch 53b, current flows from the positive electrode of the battery 2 to the fuse F1, the battery terminal 40, the battery conductor 50, the switch 53b, the load terminal 41b, and the load 3b, and thus power is supplied from the battery 2 to the load 3b. Accordingly, the switch 53b is provided on the power supply path from the positive electrode of the battery 2 to the one end of the load 3b, and the battery conductor 50 is provided on the current path of current that flows from the positive electrode of the battery 2 to the drain of the switch 53b. The load 3b operates while power is supplied from the battery 2 to the load 3b.

If the microcomputer 54 switches off the switch 53b, the supply of power from the battery 2 to the load 3b is stopped, and the load 3b stops operating.

In the power supply control device 4, current also flows from the positive electrode of the battery 2 to the fuse F1, the battery terminal 40, the battery conductor 50, the diode D1, the resistor R1, the regulator 55, the microcomputer 54, the intermediate conductor 51, the fuse portion 56, the GND conductor 52, and the GND terminal 42 in this order. The capacitor C2 smoothens the voltage that is output by the battery 2 via the fuse F1, the battery terminal 40, the battery conductor 50, the diode D1, and the resistor R1, and outputs the smoothened voltage to the regulator 55. The voltage that the capacitor C2 outputs to the regulator 55 is a voltage having the potential of the intermediate conductor 51 as a reference.

The regulator 55 generates a predetermined voltage from the voltage received from the capacitor C2, and outputs the generated predetermined voltage to the microcomputer 54. The predetermined voltage that the regulator 55 outputs to the microcomputer 54 is also a voltage having the potential of the intermediate conductor 51 as a reference. The regulator 55 outputs the predetermined voltage to the microcomputer 54, and thus the microcomputer 54 receives a supply of power.

Power is supplied from the battery 2 to the microcomputer 54 as described above. While power is being supplied from the battery 2 to the microcomputer 54, current flows from the positive electrode of the battery 2 to the battery terminal 40, the battery conductor 50, the diode D1, the resistor R1, the regulator 55, the microcomputer 54, the intermediate conductor 51, the fuse portion 56, the GND conductor 52, and the GND terminal 42 in this order. Here, the current that flows through the GND conductor 52 is output from the GND terminal 42 to the negative electrode of the battery 2 that is grounded likewise to the GND terminal 42. The GND terminal 42 functions as an output terminal.

Also, the battery conductor 50 is provided in the current path of current that flows from the positive electrode of the battery 2 to the microcomputer 54. The intermediate conductor 51 is provided in the current path of current that flows from the microcomputer 54 to the fuse portion 56. The GND conductor 52 is provided in the current path of current that flows from the fuse portion 56 to the GND terminal 42. The GND conductor 52 functions as an output conductor.

The diode D1 stops the backflow of current from the capacitor C2 to the battery 2. The resistor R1 limits the current that flows to the regulator 55 and the capacitor C2. The Zener diode Z1 limits the voltage at the cathode of the diode D1, which has the potential of the GND conductor 52 as a reference. Specifically, if the voltage at the cathode of the diode D1, which has the potential of the GND conductor 52 as a reference, reaches the breakdown voltage of the Zener diode Z1, current flows from the cathode of the diode D1 to the Zener diode Z1, the GND conductor 52, and the GND terminal 42 in this order. For this reason, with reference to the potential of the GND conductor 52, the voltage at the cathode of the diode D1 will not exceed the breakdown voltage of the Zener diode Z1. The Zener diode Z1 maintains the voltage at the cathode of the diode D1 in a range from zero V to the breakdown voltage of the Zener diode Z1, with reference to the potential of the GND conductor 52.

If a current greater than or equal to the predetermined current flows from the intermediate conductor 51 to the fuse portion 56, the capacitor C3 and the resistors R2 and R3 each break. The fuse portion 56 thus breaks. If the fuse portion 56 breaks, current will not flow from the intermediate conductor 51 to the GND conductor 52 via the fuse portion 56.

The capacitor C3 and the resistors R2 and R3 each break if the current that flows thereto is greater than or equal to a corresponding threshold current. The sizes of the three threshold currents that correspond to the capacitor C3 and the resistors R2 and R3 may have the same magnitude as each other. Also, two of the three threshold currents may have the same magnitude, and the magnitude of the one remaining site [TP1] current may be different from the other two threshold currents. Furthermore, the three threshold currents may be different from each other.

As long as the capacitor C3 and the resistors R2 and R3 all break if a current greater than or equal to the predetermined current flows to the fuse portion 56, the fuse portion 56 can be freely designed with respect to the order in which the capacitor C3 and the resistors R2 and R3 break.

For example, the fuse portion 56 may be designed such that the capacitor C3 and the resistors R2 and R3 break in the following order. If a current greater than or equal to the predetermined current flows to the fuse portion 56, first, a current greater than or equal to the threshold current that corresponds to the capacitor C3 flows to the capacitor C3, and the capacitor C3 breaks. Due to the breaking of the capacitor C3, the current that flows to the resistor R2 rises to a current that is greater than or equal to the threshold current that corresponds to the resistor R2, and the resistor R2 breaks. Due to the breaking of the resistor R2, the current that flows to the resistor R3 rises to a current that is greater than or equal to the threshold current that corresponds to the resistor R3, and the resistor R3 breaks.

Also, the fuse portion 56 may be designed such that if a current that is greater than or equal to the predetermined current flows to the fuse portion 56, currents greater than or equal to the respective threshold currents flow to the capacitor C3 and the resistors R2 and R3 at substantially the same time, and therefore these members break.

In the fuse portion 56, the capacitor C3 and the resistors R2 and R3 are connected in parallel to each other, and the capacitor C3 has a function of stabilizing the voltage between the intermediate conductor 51 and the GND conductor 52. In the fuse portion 56, the number of fuse elements that break upon receiving a current greater than or equal to a threshold is three, or more specifically two or more. For this reason, even if one among the capacitor C3 and the resistors R2 and R3 becomes defective, current can flow from the intermediate conductor 51 to the GND conductor 52 via the fuse portion 56, the supply of power from the battery 2 to the microcomputer 54 continues, and the microcomputer 54 continues to operate. If one fuse element becomes defective, there is a possibility of a decrease in the predetermined current at which the fuse portion 56 breaks.

The capacitor C1 removes disturbance noise that becomes superimposed on current between the positive electrode of the battery 2 and the battery conductor 50. The diode D2 prevents the generation of surge voltage at the load 3a. For example, if the load 3a has an inductor (not shown), when the switch 53a switches off and the supply of power from the battery 2 to the load 3a stops, the inductor raises the voltage at the other end of the load 3a, which has the potential at the one end of the load 3a as a reference, in order to maintain the magnitude of the current flowing in the load. At this time, the current flows from the other end of the load 3a to the GND terminal 42, the GND conductor 52, the diode D2, and the load terminal 41a in this order, and then returns to the one end of the load 3a. For this reason, the voltage between the ends of the load 3a will not rise to a voltage greater than or equal to the voltage between the ends of the diode D2.

Figure 2:
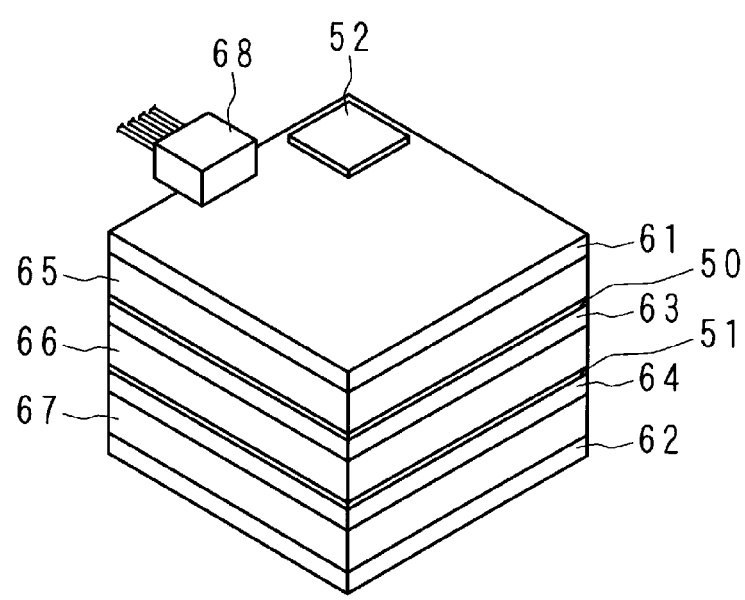
FIG. 2 is a perspective diagram showing an external view of a power supply control device.

FIG. 2 is a perspective diagram showing an external view of the power supply control device 4. The power supply control device 4 further has a first circuit board 61, a second circuit board 62, a battery substrate 63, an intermediate substrate 64, insulating resin 65, 66, and 67, and a connector 68. The first circuit board 61, the second circuit board 62, the battery substrate 63, and the intermediate substrate 64 are each a so-called printed circuit board and have a flat plate shape. The first circuit board 61, the second circuit board 62, the battery substrate 63, and the intermediate substrate 64 are arranged in the order of: first circuit board 61, battery substrate 63, intermediate substrate 64, and second circuit board 62. The arranging direction substantially matches a direction perpendicular to the plate surfaces of the first circuit board 61, the second circuit board 62, the battery substrate 63, and the intermediate substrate 64. The first circuit board 61, the second circuit board 62, the battery substrate 63, and the intermediate substrate 64 are overlaid on each other with gaps therebetween.

The resin 65 is sandwiched by the first circuit board 61 and the battery substrate 63. The resin 66 is sandwiched by the battery substrate 63 and the intermediate substrate 64. The resin 67 is sandwiched by the second circuit board 62 and the intermediate substrate 64.

The GND conductor 52, the battery conductor 50, and the intermediate conductor 51 are respectively formed on surfaces of the first circuit board 61, the battery substrate 63, and the intermediate substrate 64 that are on the same side.

For example, if at least either one of the switches 53a and 53b provided in the first circuit board 61 or the second circuit board 62 is maintained in the on state due to a failure, the switch in the on state continuously generates a large amount of heat. The resin 65, 66, and 67 each melt when subjected to heat generated by the switch, for example.

The connector 68 is disposed on the first circuit board 61. The battery terminal 40, the load terminals 41a and 41b, and the GND terminal 42 are provided in the connector 68. Conducting wires are connected to the battery terminal 40, the load terminals 41a and 41b, and the GND terminal 42. The battery terminal 40 and the load terminals 41a and 41b are respectively connected to the fuse F1 and the loads 3a and 3b by the conducting wires. The GND terminal 42 is grounded by a conducting wire.

The switches 53a and 53b, the microcomputer 54, the regulator 55, the fuse portion 56, the capacitors C1 and C2, the diodes D1 and D2, the resistor R1, and the Zener diode Z1 are each disposed on one surface of the first circuit board 61 or the second circuit board 62. The battery terminal 40, the load terminals 41a and 41b, the GND terminal 42, the battery conductor 50, the intermediate conductor 51, the GND conductor 52, the switches 53a and 53b, the microcomputer 54, the regulator 55, the fuse portion 56, the capacitors C1 and C2, the diodes D1 and D2, the resistor R1, and the Zener diode Z1 are connected with use of through-holes and conducting wires or the like that are formed in the first circuit board 61 and the second circuit board 62.

Figure 3:
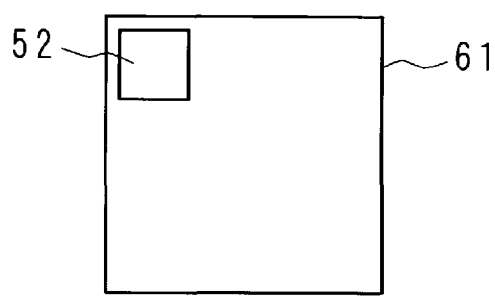
FIG. 3 is a plan view of a first circuit board, a battery substrate, and an intermediate substrate.
Figure 3:
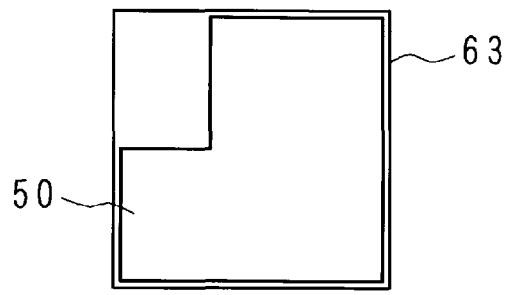
Figure 3:
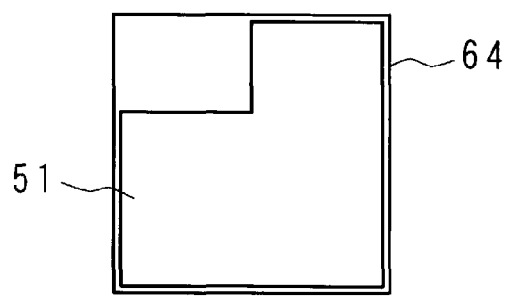

FIG. 3 is a plan view of the first circuit board 61, the battery substrate 63, and the intermediate substrate 64. The plate surfaces of the first circuit board 61, the battery substrate 63, and the intermediate substrate 64 are rectangular. The vertical and horizontal dimensions of the first circuit board 61, the battery substrate 63, and the intermediate substrate 64 are substantially the same as each other. The second circuit board 62 is not depicted in FIG. 3. The plate surface of the second circuit board 62 is also rectangular, and the vertical and horizontal dimensions of the second circuit board 62 are substantially the same as the vertical and horizontal dimensions of the first circuit board 61, the battery substrate 63, and the intermediate substrate 64.

The GND conductor 52 is rectangular, and is formed in a corner portion (upper left portion) of the first circuit board 61. The first circuit board 61 functions as an output substrate. In the first circuit board 61, one or more elements among the switches 53a and 53b, the microcomputer 54, the regulator 55, the fuse portion 56, the capacitors C1 and C2, the diodes D1 and D2, the resistor R1, and the Zener diode Z1 are disposed in a portion other than the portion where the GND conductor 52 is formed.

Note that the connector 68 is also not depicted in FIG. 3.

The battery conductor 50 is a formed in a portion of the battery substrate 63 other than the corner portion (upper left portion in FIG. 3). The intermediate conductor 51 is formed in a portion of the intermediate substrate 64 other than the corner portion (upper left portion in FIG. 3).

Figure 4:
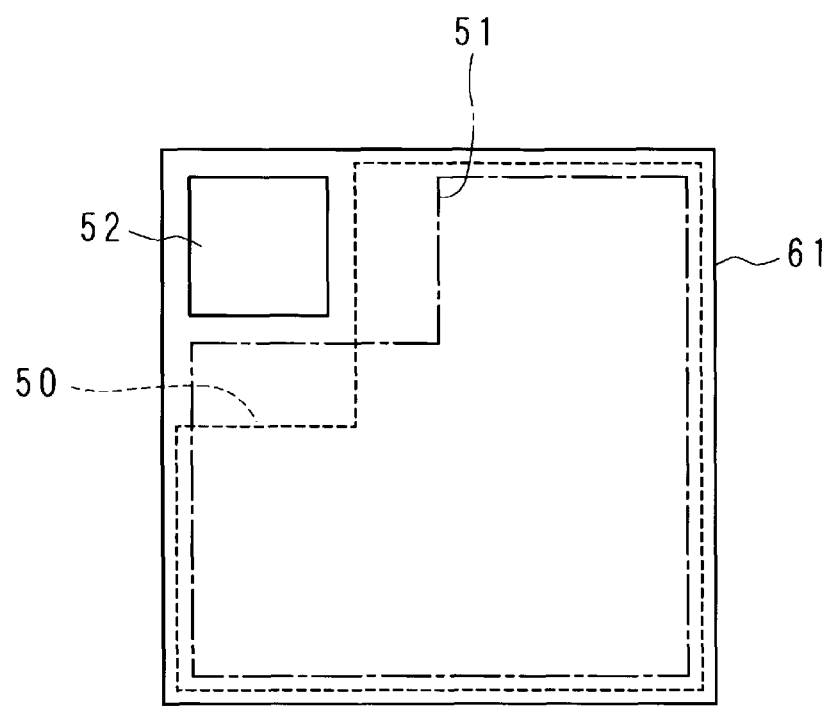
FIG. 4 is a plan view of the power supply control device.

FIG. 4 is a plan view of the power supply control device 4. The arrangement of the battery conductor 50, the intermediate conductor 51, and the GND conductor 52 is shown schematically in FIG. 4. The arrangement region of the battery conductor 50 is shown by a dashed line. The arrangement region of the intermediate conductor 51 is shown by a dashed-dotted line.

As shown in FIG. 4, the GND conductor 52 faces the portion of the battery substrate 63 other than the portion where the battery conductor 50 is formed. Also, the GND conductor 52 faces the portion of the intermediate substrate 64 other than the portion where the intermediate conductor 51 is formed.

In the power supply control device 4 having the above configuration, the microcomputer 54, the regulator 55, and the other end of the capacitor C2 are each connected to the GND terminal 42 via the fuse portion 56. For this reason, in the power supply control device 4, the GND conductor 52 can be a conductor that has a smaller surface area than the surface area of the GND conductor of a power supply control device in which the microcomputer 54, the regulator 55, and the one end of the capacitor C2 are directly connected to the GND conductor. In this case, when the resin 65 melts, there is a low probability of contact between the battery conductor 50 and the GND conductor 52, and therefore there is a low probability of the formation of a short-circuit between the positive electrode of the battery 2 and the GND terminal 42.

If the battery conductor 50 and the intermediate conductor 51 come into contact with each other due to melting of the resin 66, current flows from the positive electrode of the battery 2 to the fuse F1, the battery terminal 40, the battery conductor 50, the intermediate conductor 51, the fuse portion 56, the GND conductor 52, and the GND terminal 42 in this order, and returns to the negative electrode of the battery 2. As previously described, if a current greater than or equal to the predetermined current flows to the fuse portion 56, the fuse portion 56 breaks. For this reason, if the battery conductor 50 and the intermediate conductor 51 come into contact with each other, a current greater than or equal to the predetermined current will not flow between the positive electrode of the battery 2 and the GND terminal 42.

The power supply control device 4 is configured such that if the battery conductor 50 and the intermediate conductor 51 come into contact with each other, the fuse portion 56 breaks before the fuse F1 breaks. In other words, the given current related to the fuse F1 is greater than the predetermined current related to the fuse portion 56.

Also, as previously described, the GND conductor 52 formed on the first circuit board 61 faces the portion of the battery substrate 63 other than the portion where the battery conductor 50 is formed. For this reason, even if the resin 65 melts, and the first circuit board 61 and the battery substrate 63 come into contact with each other, there is a low probability of contact between the battery conductor 50 and the GND conductor 52. For this reason, the probability of contact between the positive electrode of the battery 2 and the GND terminal 42 is even lower.

More specifically, it is preferable that the GND conductor 52 and the conducting wire directly connected to the GND conductor 52 face the portion of the battery substrate 63 other than the portion where the battery conductor 50 and the conducting wire connected to the battery conductor 50 are formed. In this case, the probability of contact between the positive electrode of the battery 2 and the GND terminal 42 is reduced further.

Also, as previously described, the GND conductor 52 formed on the first circuit board 61 faces the portion of the intermediate substrate 64 other than the portion where the intermediate conductor 51 is formed. For this reason, even if the resin 65 and 66 melts, and the first circuit board 61, the battery substrate 63, and the intermediate substrate 64 come into contact with each other, there is a low probability of contact between the battery conductor 50 and the intermediate conductor 51, contact between the intermediate conductor 51 and the GND conductor 52, and the formation of a short-circuit between the positive electrode of the battery 2 and the GND terminal 42.

More specifically, it is preferable that the GND conductor 52 and the conducting wire connected to the GND conductor 52 face the portion of the intermediate substrate 64 other than the intermediate conductor 51 and the portion directly connected to the intermediate conductor 51. In this case, the probability of contact between the positive electrode of the battery 2 and the GND terminal 42 is reduced further.

Note that the arrangement order of the first circuit board 61, the second circuit board 62, the battery substrate 63, and the intermediate substrate 64 is not limited to the order of: first circuit board 61, battery substrate 63, intermediate substrate 64, and second circuit board 62. It is sufficient that the first circuit board 61 is overlaid on the second circuit board 62, the battery substrate 63, and the intermediate substrate 64 with gaps therebetween.

Also, the fuse elements that constitute the fuse portion 56 are not limited to being a resistor or a capacitor, and may be a fuse, an inductor, or the like. The three fuse elements that constitute the fuse portion 56 are not limited to being made up of two resistors and one capacitor, and may be made up of three resistors, for example. It is sufficient that fuse elements that break when a current greater than or equal to the threshold current flows thereto are connected in parallel to each other in the fuse portion 56. Furthermore, the number of fuse elements that constitute the fuse portion 56 is not limited to three, and may be one, two, or four or more.

Furthermore, the GND conductor 52, the battery conductor 50, and the intermediate conductor 51 are not required to be formed on surfaces of the first circuit board 61, the battery substrate 63, and the intermediate substrate 64 that are one the same side.

The embodiment disclosed here is to be considered in all respects as illustrative and not limiting. The scope of the present disclosure is indicated by the claims rather than by the foregoing description, and all changes which come within the meaning and range of equivalency of the claims are intended to be embraced therein.

LIST OF REFERENCE NUMERALS

2 Battery
3a, 3b Load
4 Power supply control device
42 GND terminal (output terminal)
50 Battery conductor
51 Intermediate conductor
52 GND conductor (output conductor)
53a, 53b Switch
54 Microcomputer (switch control portion)
56 Fuse portion
61 First circuit board (output substrate)
63 Battery substrate
64 Intermediate substrate
C3 Capacitor (fuse element)
R2, R3 Resistor (fuse element)

The invention claimed is:

1. A power supply control device having a switch control portion that switches on and off a switch provided in a power supply path from a battery to a load and receives a supply of power from the battery, and an output terminal from which current received from the battery via the switch control portion is output, the power supply control device comprising:

a battery conductor that is provided in a current path of current that flows from the battery to each of the switch and the switch control portion;
a battery substrate on which the battery conductor is formed;
an output conductor that is provided in a current path of current that flows from the fuse portion to the output terminal; and
an output substrate on which the output conductor is formed,
wherein the battery substrate and the output substrate are overlaid on each other with a gap therebetween, and
the output conductor faces a portion of the battery substrate other than a portion where the battery conductor is formed; and
a fuse portion that is connected between the switch control portion and the output terminal, and that breaks if a current greater than or equal to a predetermined current flows to the fuse portion,
wherein while power is being supplied from the battery to the switch control portion, current flows from the battery to the switch control portion, the fuse portion, and the output terminal in this order.

2. The power supply control device according to claim 1, further comprising:

an intermediate conductor that is provided in a current path of current that flows from the switch control portion to the fuse portion; and
an intermediate substrate on which the intermediate conductor is formed,
wherein the output substrate and the intermediate substrate are overlaid on each other with a gap therebetween, and
the output conductor faces a portion of the intermediate substrate other than a portion where the intermediate conductor is formed.

3. The power supply control device according to claim 1, wherein the fuse portion has a plurality of fuse elements that break if a current greater than or equal to the predetermined current flows to the fuse portion, and the plurality of fuse elements are connected in parallel to each other.

* * * * *